(12) United States Patent
Klintø et al.

(10) Patent No.: US 11,110,762 B2
(45) Date of Patent: Sep. 7, 2021

(54) TRAILER HITCH GUIDE ADAPTOR

(71) Applicant: KLINTFAX DESIGN IVS, Gilleleje (DK)

(72) Inventors: Steen Klintø, Gilleleje (DK); Thomas Faxe, Dronningmølle (DK)

(73) Assignee: Klintfax Design IVS, Gilleleje (DK)

( * ) Notice: Subject to any disclaimer, the term of this patent is extended or adjusted under 35 U.S.C. 154(b) by 194 days.

(21) Appl. No.: 16/320,573

(22) PCT Filed: Jun. 14, 2017

(86) PCT No.: PCT/EP2017/064574
§ 371 (c)(1),
(2) Date: Jan. 25, 2019

(87) PCT Pub. No.: WO2018/019470
PCT Pub. Date: Feb. 1, 2018

(65) Prior Publication Data
US 2019/0248197 A1  Aug. 15, 2019

(30) Foreign Application Priority Data

Jul. 27, 2016  (DK) .......................... PA 2016 70558

(51) Int. Cl.
*B60D 1/36* (2006.01)
*B60D 1/06* (2006.01)
*B60D 1/48* (2006.01)

(52) U.S. Cl.
CPC ............... *B60D 1/363* (2013.01); *B60D 1/06* (2013.01); *B60D 1/48* (2013.01)

(58) Field of Classification Search
CPC ........... B60D 1/363; B60D 1/48; B60D 1/488
See application file for complete search history.

(56) References Cited

U.S. PATENT DOCUMENTS 4,254,968 A    3/1981  DelVecchio
4,416,466 A    11/1983 Park
(Continued)

FOREIGN PATENT DOCUMENTS

DE          100 24 916 A1    10/2001
DE     10 2005 050 427 A1    4/2007
(Continued)

*Primary Examiner* — Minnah L Seoh
*Assistant Examiner* — Harold Eric Pahlck, III
(74) *Attorney, Agent, or Firm* — BakerHostetler

(57) ABSTRACT

The present disclosure relates in a first aspect to a trailer hitch guide adaptor for a trailer tongue coupler, comprising: a mounting plate configured for attachment to the trailer tongue coupler, the mounting plate having an mounting plate upper-surface and a mounting plate front-end; a pair of guide plates, each of the guide plates attached below the mounting plate, each of the guide plates having a guide plate front-end and a guide plate back-end, wherein said guide plates are angled relative to each other, whereby each of the guide plate back-ends converge towards each other; and a third guide plate extending outwards from the mounting plate front-end, the third guide plate having a third guide plate upper surface, wherein the third guide plate upper surface defines an obtuse angle relative to the mounting plate upper surface, such that a hitch ball is able to be guided towards the mounting plate front-end via the third guide plate, and/or from below the mounting plate and towards the guide plate back ends via one of the guide plates attached below the mounting plate.

16 Claims, 5 Drawing Sheets

(56) References Cited

U.S. PATENT DOCUMENTS

| | | | |
|---|---|---|---|
| 5,114,170 A * | 5/1992 | Lanni | B60D 1/363 |
| | | | 280/477 |
| 5,549,316 A | 8/1996 | Jones | |
| 5,769,443 A | 6/1998 | Muzny | |
| 6,179,318 B1 * | 1/2001 | Howard | B60D 1/363 |
| | | | 280/477 |
| 6,796,573 B2 | 9/2004 | Beaudoin | |
| 7,568,717 B2 | 8/2009 | Ayoub | |
| 7,690,671 B1 | 4/2010 | Jensen | |
| 9,272,590 B2 | 3/2016 | Hochanadel | |
| 9,630,464 B2 | 4/2017 | Hochanadel | |
| 2002/0101055 A1 | 8/2002 | Warren | |
| 2007/0007748 A1 | 1/2007 | Hancock | |
| 2007/0205580 A1 * | 9/2007 | Hamilton | B60D 1/66 |
| | | | 280/477 |
| 2015/0273961 A1 | 10/2015 | Hochanadel | |
| 2017/0015164 A1 * | 1/2017 | Potter | B60D 1/065 |

FOREIGN PATENT DOCUMENTS

| | | |
|---|---|---|
| DK | 2012 00113 U3 | 1/2013 |
| SE | 532 760 C2 | 3/2010 |

* cited by examiner

TRAILER HITCH GUIDE ADAPTOR

CROSS-REFERENCE TO RELATED APPLICATIONS

This application is the National Stage of International Patent Application No. PCT/EP2017/064574, filed Jun. 14, 2017, which claims the benefit of Danish application number PA 2016 70558, filed Jul. 27, 2016, the disclosures of which are incorporated herein by reference in their entireties.

FIELD OF INVENTION

The present disclosure relates to a trailer hitch guide adaptor, more specifically to be mounted on a trailer tongue coupler, i.e. on part of a trailer. The disclosure further relates to a trailer tongue coupler attached with the trailer hitch guide adaptor.

BACKGROUND OF INVENTION

Trailer tongue couplers on trailers typically have a hole adapted to receive a hitch ball, typically placed on a towing vehicle, or a car, such that the hitch ball is able to connect with a lock inside the trailer tongue coupler, thereby connecting the towing vehicle to the trailer. Connecting the hitch ball to the hole on the trailer tongue coupler requires a lot a driving in reverse. The driver needs to carefully drive the car towards the trailer, more specifically towards the trailer tongue. Depending on the reverse driving skills of the driver, the hitch ball is typically placed within a meter of the hole of the trailer tongue. Hereafter, the driver might be able to step out of the car and grab the trailer tongue, such that the driver pulls and/or pushes the trailer by the trailer tongue the last meter and might be able to place the hole above the hitch ball, release the trailer tongue, and thereby connect the trailer to the car. The described manoeuvre might be possible if the driver is strong and/or the trailer is light weight. Nevertheless, the manoeuvres might not be desirable and even dangerous. Furthermore, for heavy trailers, and regardless of how strong the driver is, the described manoeuvre might be impossible.

A problem is that it is not easy and/or impossible to connect a trailer to a car. One solution to this problem is to provide a trailer tongue coupler with two guide plates, such that the hitch ball is guided towards the hole of the trailer tongue coupler.

However, using the trailer tongue couplers with two guide plates is problematic because their construction is weak, and might easily break, especially when a heavy car bumps into the guide plates. Furthermore, getting the trailer tongue couplers with two guide plates is typically an expensive solution. Thus, there is a need for a solidly constructed trailer tongue coupler. Furthermore, there is also a need for providing a low cost trailer tongue coupler.

SUMMARY OF INVENTION

The present disclosure relates in a first aspect to a trailer hitch guide adaptor for a trailer tongue coupler, comprising: a mounting plate configured for attachment to the trailer tongue coupler, the mounting plate having an mounting plate upper-surface and a mounting plate front-end; a pair of guide plates, each of the guide plates attached below the mounting plate, each of the guide plates having a guide plate front-end and a guide plate back-end, wherein said guide plates are angled relative to each other, whereby each of the guide plate back-ends converge towards each other and towards a converging line; and a third guide plate extending outwards from the mounting plate front-end, the third guide plate having a third guide plate upper surface, wherein the third guide plate upper surface defines an obtuse angle relative to the mounting plate upper surface, such that a hitch ball is able to be guided towards the mounting plate front-end via the third guide plate, and/or from below the mounting plate and towards the guide plate back ends via one of the guide plates attached below the mounting plate.

By the present trailer hitch guide adaptor is first of all provided means for providing a low cost trailer tongue coupler, in that the just presented trailer hitch guide adaptor is able to convert a low cost trailer tongue coupler to a trailer hitch guide, simply by mounting the trailer hitch guide adaptor to an existing trailer tongue coupler.

Furthermore, by the present trailer hitch guide adaptor, when mounted to a trailer tongue coupler, is also provided a solidly constructed trailer tongue coupler that is able to guide a hitch ball into a position, where the hitch ball is able to connect to the trailer tongue coupler. In particular because there is a third guide plate extending outwards from the mounting plate front-end, there is facilitated a solid construction. The third guide plate serves per se as an extra guidance of the hitch ball. Due to the construction as here described, the third guide plate has a connection from the mounting plate, i.e. from a line on the mounting plate front-end, which facilitates that force from a hitch ball is transferred to the mounting plate via several points on that line. Preferably, the mounting plate front-end defined a width of more than 5 cm, such as more than 10 cm, or such as more than 15 cm.

A third guide plate is known from designs of hitch guides located on cars, neither on an adaptor for a trailer tongue coupler nor on a trailer tongue coupler. However, on these designs, the third guide plate typically extend from a converging point, thus not a line as in the present invention. Accordingly, hitch guides with a third guide plate located on cars have been constructions rather weakly. The present invention provides for a very robust construction. Furthermore, because the guide plates are attached below the mounting plate, and the third guide plate extends upwards from the mounting plate, the third guide plate also serves to protect the trailer tongue coupler from the hitch ball during connection.

Furthermore, since the hitch ball is first guided towards the mounting plate front-end via the third guide plate, and secondly from below the mounting plate and towards the guide plate back ends via one of the guide plates attached below the mounting plate, there is provided a design, where a hitch ball in two-steps is guided towards the point of interest, in this case towards the guide plate back ends. A two-step guidance as here described provides for a more efficient guidance than single-step guidance, for example as is the case with previous designs having only guide plates that all start in one plane and end in another plane.

Due to the guide plates being attached below the mounting plate, the guide plates are not visible from above. Thus, the guide plates are not physically accessible from above. Therefore, the guide plates do not easily get in contact with physical objects from above, for example hands and/or other body parts handling the mounting plate.

In some embodiments, the pair of guide plates is completely covered by the mounting plate. In other words, the guide plate front-ends are below the mounting plate. In this way, any corners on the guide plate front-ends are not accessible from above, making the invention a safe adaptor and/or a safe trailer tongue coupler.

In a preferred embodiment of the trailer hitch guide adaptor, the guide plate back-ends are connected to each other at or around the converging line to form a single-piece guiding-structure. The single-piece guiding-structure may for example be formed by the two guide plates being connected to each other, such as by welding or glue. Alternatively, the single-piece guiding-structure may be formed by a single plate, for example a single plate being bended. In other words, the single-piece guiding structure may form a V-shape. The V-shape is seen from above, where the connection of the two guide plates either form a soft or a sharp connection, i.e. a connection that either forms a corner or a curve.

The single-piece guiding-structure is more robust than two separate plates, and also provides fewer edges than two separate plates. Accordingly, the invention is more robust and safer to use.

The guide plate back-ends may be connected through an additional section, such as a bended section. As just described, the single-piece guiding structure may be formed by a single plate being bended, such that the bended section is part of the single plate. Alternatively, the bended section may be a separate plate being bended and connected to the each of the guide plate back-ends. The three plates may then form the single-piece guiding-structure by for example welding the three plates together.

By having a single-piece guiding structure, the connection of the two guide plates, proves a reinforced section. The reinforced section is where the two guide plates are connected. Thus, the reinforced section may be where the two guide plates are welded together, or it may be at the bended section.

The inventors of the present invention have found that the single-piece guiding structure provides several advantages, as will be described in the following.

For example, when connecting a trailer ball (such as located on a car), to a trailer, an overrun brake is commonly installed on the trailer, more specifically on the trailer tongue coupler. Drivers of the car, typically rely on the overrun brake, and are thus not afraid of reversing the car with the hitch ball at great speed into the connection point of trailer. If two separate guide plates are used instead of a single-piece guiding structure, the inventors realized that such two guide plates would easily bend by the impact of the hitch ball. Thereby, the hitch ball would continue with great impact into other parts of the trailer, i.e. behind the guide plates, and in many cases destroy both the two separate plates and the other parts of the trailer. The present invention avoids this by having the single-piece guiding-structure.

Further, when a hitch ball is connected to a trailer using the trailer hitch guide adaptor according to the present invention, the trailer may either have an overrun brake installed on the trailer or not. In cases, where the trailer does not have an overrun brake installed, the single-piece guiding-structure also provides for a safe connection that is able to withstand the impact of the trailer without destroying the two guide plates. In cases, where the trailer has an overrun brake installed, and the overrun brake is not working properly, the single-piece guiding-structure also provides for a safe connection enabling impact of the trailer without destroying the two guide plates. As explained above, the same case is present even if the overrun brake is working properly.

Accordingly, the single-piece guiding-structure facilitates both the effect of guiding the hitch ball in place, and the effect of stopping the hitch ball once the hitch ball is in place.

All in all, the present invention provides an improved and very safe trailer hitch guide adaptor as is also the objective of the present invention.

Further, the present invention provides for a non-complex design that is easy to manufacture, in particular because the two guide plates are formed as a single-piece guiding structure. Accordingly, the present invention provides for a trailer tongue coupler that is able to be manufactured at low cost in comparison to more complex designs.

In a second aspect of the present disclosure there is provided a trailer tongue coupler attached with the trailer hitch guide adaptor as described above.

Advantages of the here described trailer tongue coupler includes the same advantages as for the trailer hitch guide adaptor. An additional advantage of having in attached in one way or another is that it provides for a robust construction of a trailer tongue coupler.

DETAILED DESCRIPTION OF THE INVENTION

Figure 1:
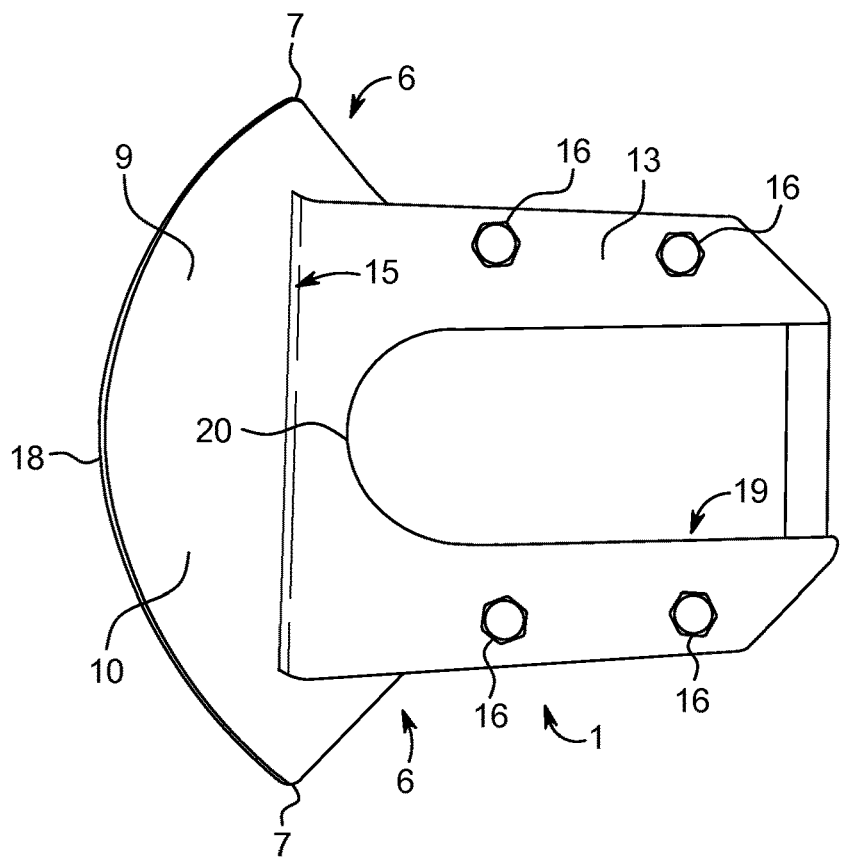
FIG. 1 shows an embodiment of the trailer hitch guide adaptor according to the invention from a top view.

The present disclosure relates in one aspect to a trailer hitch guide adaptor. The trailer hitch guide adaptor comprises several plates. These plates are described in further details below.

Mounting Plate

In one embodiment of the trailer hitch guide adaptor, the mounting plate further comprising a hole adapted to receive a hitch ball such that the hitch ball is able to connect with a lock inside the trailer tongue coupler. The hole may have any shape, such as circular oval, rectangular, and/or combined shapes. In some embodiments, the hole is a slit. The hole may be with a rim, wherein the rim is closed. In some embodiments, the rim is open.

Reinforcement Plate

In one embodiment of the trailer hitch guide adaptor, the mounting plate further comprises a reinforcement plate attached to the third guide plate upper surface, the reinforcement plate having a reinforcement plate lower surface and a reinforcement plate front-end being attached to the third guide plate upper surface, such that the reinforcement lower plate surface is parallel to the mounting plate upper surface, wherein the mounting plate and the reinforcement plate are mechanically connected to each other, thereby reinforcing the attachment of the third guide plate to the mounting plate. As previously described, the third guide plate is for protecting the trailer tongue coupler, and the reinforcement plate adds further protection to the trailer tongue coupler.

The reinforcement plate may be connected to the mounting plate by various means. In some embodiments, the reinforcement plate and the mounting plate is mechanically coupled to each other via fastening means, such as screws and/or welded material and/or glue. In other embodiments, the reinforcement plate and the mounting plate is connected to each other via a connecting plate. The connecting plate and the mounting plate may be made of one piece of material, for example to provide a solid construction.

In some embodiments of the trailer hitch guide adaptor, the reinforcement plate further comprises a slit with a slit-end facing the reinforcement plate front-end, whereby the slit is able to slide onto an outer surface of the trailer tongue coupler. This may provide for easy attachment of the trailer hitch guide adaptor to the trailer tongue coupler.

In a preferred embodiment of the trailer hitch guide adaptor, the mounting plate and a the reinforcement plate are separated from each other, thereby forming a gap between the mounting plate and the reinforcement plate, whereby the trailer hitch guide adaptor is able to slide onto an outer surface of the trailer tongue coupler. This may also provide for easy attachment of the trailer hitch guide adaptor to the trailer tongue coupler.

Pair of Guide Plates

In one embodiment of the trailer hitch guide adaptor, the pair of guide plates is angled relative to each other with an angle between 60 and 120 degrees, such as around 90 degrees or such as around 100 degrees.

In another embodiment of the trailer hitch guide adaptor, each of the guide plate back-ends converge such that the mounting plate front-end and said guide plates defines an inscribed circle on a surface below the mounting plate with a diameter greater than 4 cm, such as greater than 5 cm, or such as greater than 6 cm. With these diameters, the inscribed circle is equal to or greater than the diameter of the hitch ball. From this, it is clear that the hitch ball is to be guided below the mounting plate, such that the hitch ball connects to the trailer tongue coupler though the mounting plate. Advantages of the inventions are indeed related to solid construction but also solid connections. As here described, the connection is via the mounting plate, and this adds strength to the connection. In other words, the adaptor strengthens the trailer tongue coupler, in particular around the hole of the trailer tongue coupler.

In yet another embodiment of the trailer hitch guide adaptor, said pair of guide plates are a single plate being bended. Such a construction may first of all be more robust than two separate plates, but may also provide fewer edges, making the invention even safer to use.

Third Guide Plate

In one embodiment of the trailer hitch guide adaptor, the obtuse angle is between 120 and 150 degrees, such as around 130 degrees, such as around 135 degrees, or such as around 140 degrees.

In a second embodiment of the trailer hitch guide adaptor, the third guide plate has a third guide plate front-end with a curved path. As previously described, advantages of the present invention relate to safe use, and by having a curved path, sharp corners and/or edges are avoided. Furthermore, since the third guide plate is on the trailer hitch guide being connected to the trailer tongue coupler, and this follows the car as it drives, in particular turns around a corner, the curved path on the third guide plate is provides for the trailer hitch guide adaptor to be as close as possible to the car as possible during turning. In other words, the distance from the curved path to the back of the car is kept constant regardless of which direction the car drives. Thus, the curved path provides for a compact, hence more robust design.

In a preferred embodiment of the trailer hitch guide adaptor, at least the mounting plate and the third guide plate are formed by a single piece. This too, provides for a solid construction.

Trailer Tongue Coupler

According to the second aspect of the invention, an embodiment of the trailer tongue coupler is such that the trailer hitch guide adaptor is permanently attached to the trailer tongue coupler by welding. In other words, the present invention provides a trailer tongue coupler for a trailer. The trailer tongue coupler comprises guide plates with the same features as described for the trailer hitch guide adaptor.

In a preferred embodiment of the trailer tongue coupler, the trailer tongue coupler and trailer hitch guide adaptor are integrated to each other. In other words, the trailer hitch guide adaptor is an integral part of the trailer tongue coupler.

Example 1—Trailer Hitch Guide Adaptor

FIG. 1 shows a trailer hitch guide adaptor 1 for a trailer tongue coupler 2 (not present in this example) as seen from a top view. The trailer hitch guide adaptor 1 comprises a mounting plate 3 (not to be seen from this view) configured for attachment to the trailer tongue coupler 2. There is a pair of guide plates 6, each of the guide plates 6 attached below the mounting plate 3, each of the guide plates 6 having a guide plate front-end 7 and a guide plate back-end 8 (not to be seen from this view), wherein said guide plates 6 are angled relative to each other, whereby each of the guide plate back-ends 8 converge towards each other; and a third guide plate 9 extending outwards from the mounting plate front-end 5 (not to be seen from this view), the third guide plate 9 having a third guide plate upper surface 10, wherein the third guide plate upper surface 10 defines an obtuse angle 11 (not to be seen from this view) relative to the mounting plate upper surface 4 (not to be seen from this view). The mounting plate 3 further comprises a reinforcement plate 13 attached to the third guide plate upper surface 10, the reinforcement plate having a reinforcement plate lower surface 14 (not to be seen from this view) and a reinforcement plate front-end 15 being attached to the third guide plate upper surface 10, such that the reinforcement lower plate surface 14 is parallel to the mounting plate upper surface 4, wherein the mounting plate 3 and the reinforcement plate 13 are mechanically connected to each other, thereby reinforcing the attachment of the third guide 9 plate to the mounting plate 3. In the embodiment as shown, the third guide plate 9 and mounting plate 3 are coupled to each other via screws 16. The third guide plate 9 is further shown with a third guide plate front-end with a curved path 18. The reinforcement plate 13 further comprises a slit 19 with a slit-end 20 facing the reinforcement plate front-end 15, whereby the slit 19 is able to slide onto an outer surface of the trailer tongue coupler 2.

Example 2—Trailer Hitch Guide Adaptor

Figure 2:
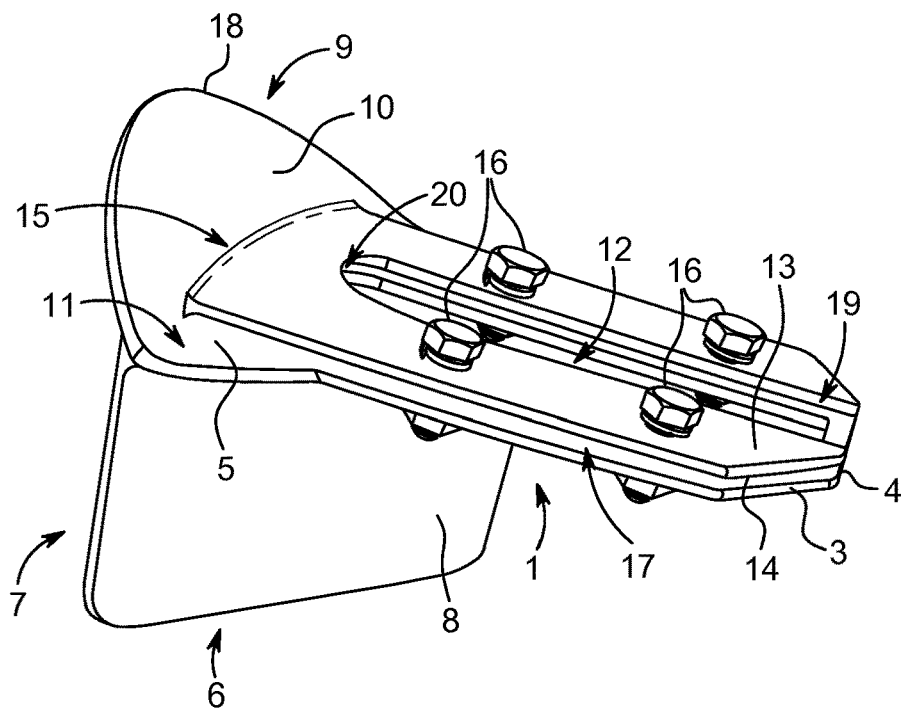
FIG. 2 shows an embodiment of the trailer hitch guide adaptor according to the invention from a side view.

FIG. 2 shows a trailer hitch guide adaptor 1 for a trailer tongue coupler 2 (not present in this example) as seen from a side view. The trailer hitch guide adaptor 1 comprises a mounting plate 3 configured for attachment to the trailer tongue coupler 2. The mounting plate 3 has a mounting plate upper surface 4 and a mounting plate front-end 5; a pair of guide plates 6 (only one to be seen from this view), each of the guide plates 6 attached below the mounting plate 3, each of the guide plates 6 having a guide plate front-end 7 and a guide plate back-end 8, wherein said guide plates 6 are angled relative to each other, whereby each of the guide plate back-ends 8 converge towards each other; and a third guide plate 9 extending outwards from the mounting plate front-end 5, the third guide plate 9 having a third guide plate upper surface 10, wherein the third guide plate upper surface 10 defines an obtuse angle 11 relative to the mounting plate upper surface 4. The mounting plate further comprising a hole 12 adapted to receive a hitch ball such that the hitch ball is able to connect with a lock inside the trailer tongue coupler 2. The mounting plate 3 further comprises a reinforcement plate 13 attached to the third guide plate upper surface 10, the reinforcement plate having a reinforcement plate lower surface 14 and a reinforcement plate front-end 15 being attached to the third guide plate upper surface 10, such that the reinforcement lower plate surface 14 is parallel to the mounting plate upper surface 4, wherein the mounting plate 3 and the reinforcement plate 13 are mechanically connected to each other, thereby reinforcing the attachment of the third guide 9 plate to the mounting plate 3. In the embodiment as shown, the third guide plate 9 and mounting plate 3 are coupled to each other via screws 16. The mounting plate 3 and a the reinforcement plate 13 are separated from each other, thereby forming a slit 17 between the mounting plate 3 and the reinforcement plate 13, whereby the trailer hitch guide adaptor 1 is able to slide onto an outer surface of the trailer tongue coupler 2. As can also be seen from the present embodiment, the pair of guide plates 6 is formed by a single plate being bended. The third guide plate 9 is further shown with a third guide plate front-end with a curved path 18. The reinforcement plate 13 further comprises a slit 19 with a slit-end 20 facing the reinforcement plate front-end 15, whereby the slit 19 is able to slide onto an outer surface of the trailer tongue coupler 2.

Example 3—Trailer Hitch Guide Adaptor

Figure 3:
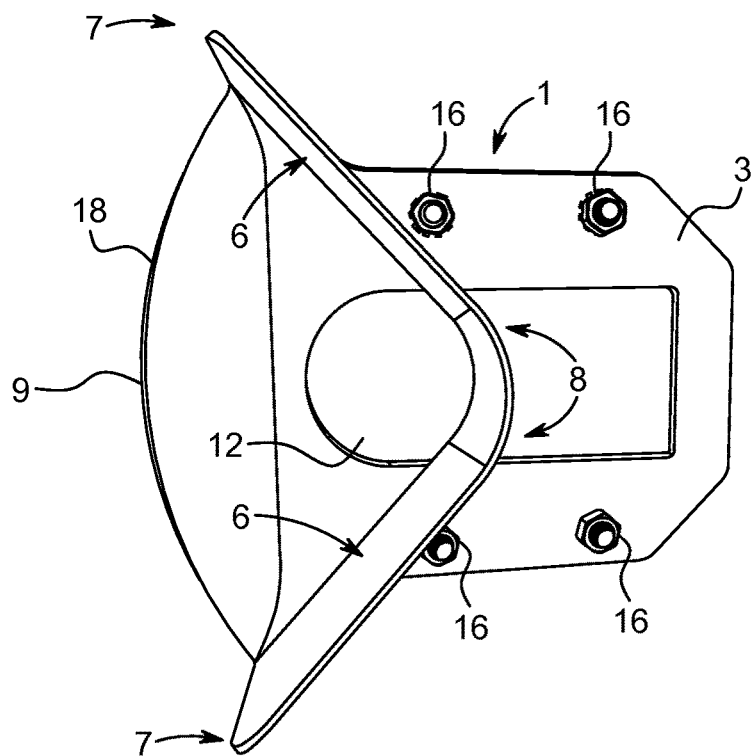
FIG. 3 shows an embodiment of the trailer hitch guide adaptor according to the invention as seen from below.

FIG. 3 shows a trailer hitch guide adaptor 1 for a trailer tongue coupler 2 (not present in this example) as seen from below. The trailer hitch guide adaptor 1 comprises a mounting plate 3 configured for attachment to the trailer tongue coupler 2. The mounting plate 3 has a mounting plate upper surface 4 (not to be seen from this view) and a mounting plate front-end 5 (not to be seen from this view); a pair of guide plates 6, each of the guide plates 6 attached below the mounting plate 3, each of the guide plates 6 having a guide plate front-end 7. The pair of guide plates 6 is formed by a single plate being bended, meaning each of the guide plate back-ends 8 connect to each other. Thus, the present example shows how the two guide plates 6 form a single-piece guiding-structure. A bended section is clearly shown between the guide plate back-ends 8. The guide plates 6 are angled relative to each other, and each of the guide plate back-ends 8 converge in the same plate in the single plate. A third guide plate 9 extends outwards from the mounting plate front-end 5, the third guide plate 9 having a third guide plate upper surface 10 (not to be seen from this view), wherein the third guide plate upper surface 10 defines an obtuse angle 11 (not to be seen from this view) relative to the mounting plate upper surface 4. The mounting plate further comprising a hole 12 adapted to receive a hitch ball such that the hitch ball is able to connect with a lock inside the trailer tongue coupler 2. As can be seen, the hole is much larger than the hitch ball because the hole is also adapted to allow for the lock to operate, i.e. move up and down in the hole. From this view, it can be seen that each of the guide plate back-ends 8 converge such that the mounting plate front-end 5 and said guide plates 7 defines an inscribed circle on a surface below the mounting plate 3 being greater than the diameter of a hitch ball. This allows for the ball to slide on the mounting plate 3 before it enters the hole. The distance from the outer perimeter to the mounting plate front-end 5 has a distance of more than 5 mm. Having a certain distance facilitates a reinforced rim around the lock in the trailer tongue coupler 2. As can also be seen, the hole is with a rim, wherein the rim is closed. The closed rim also provides for stability of the trailer hitch guide adaptor 1. However, if the trailer hitch guide adaptor is an integral part of the trailer tongue, a closed rim might not be used in that integration might provide for stability. The third guide plate 9 is further shown with a third guide plate front-end with a curved path 18.

Example 4—Trailer Hitch Guide Adaptor

Figure 4:
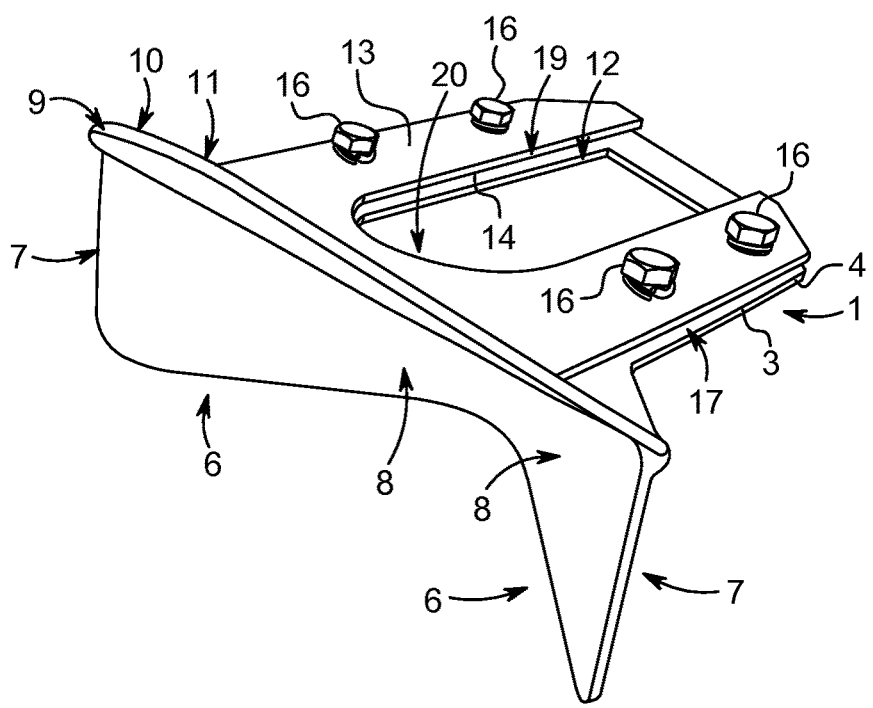
FIG. 4 shows an embodiment of the trailer hitch guide adaptor according to the invention from a perspective view.

FIG. 4 shows a trailer hitch guide adaptor 1 for a trailer tongue coupler 2 (not present in this example) as seen from a perspective view. The trailer hitch guide adaptor 1 comprises a mounting plate 3 configured for attachment to the trailer tongue coupler 2. The mounting plate 3 has a mounting plate upper surface 4 and a mounting plate front-end 5 (not to be seen from this view); a pair of guide plates 6, each of the guide plates 6 attached below the mounting plate 3, each of the guide plates 6 having a guide plate front-end 7 and a guide plate back-end 8, wherein said guide plates 6 are angled relative to each other, whereby each of the guide plate back-ends 8 converge towards each other; and a third guide plate 9 extending outwards from the mounting plate front-end 5, the third guide plate 9 having a third guide plate upper surface 10, wherein the third guide plate upper surface 10 defines an obtuse angle 11 relative to the mounting plate upper surface 4. The mounting plate 3 further comprises a reinforcement plate 13 attached to the third guide plate upper surface 10, the reinforcement plate having a reinforcement plate lower surface 14 and a reinforcement plate front-end 15 (not to be seen from this view) being attached to the third guide plate upper surface 10, such that the reinforcement lower plate surface 14 is parallel to the mounting plate upper surface 4, wherein the mounting plate 3 and the reinforcement plate 13 are mechanically connected to each other, thereby reinforcing the attachment of the third guide 9 plate to the mounting plate 3. In the embodiment as shown, the third guide plate 9 and mounting plate 3 are coupled to each other via screws 16. The mounting plate 3 and a the reinforcement plate 13 are separated from each other, thereby forming a slit 17 between the mounting plate 3 and the reinforcement plate 13, whereby the trailer hitch guide adaptor 1 is able to slide onto an outer surface of the trailer tongue coupler 2. As can also be seen from the present embodiment, the pair of guide plates 6 is formed by a single plate being bended. The reinforcement plate 13 further comprises a slit 19 with a slit-end 20 facing the reinforcement plate front-end 15, whereby the slit 19 is able to slide onto an outer surface of the trailer tongue coupler 2.

Example 5—Trailer Hitch Guide Adaptor Attached to Trailer Tongue Coupler

Figure 5:
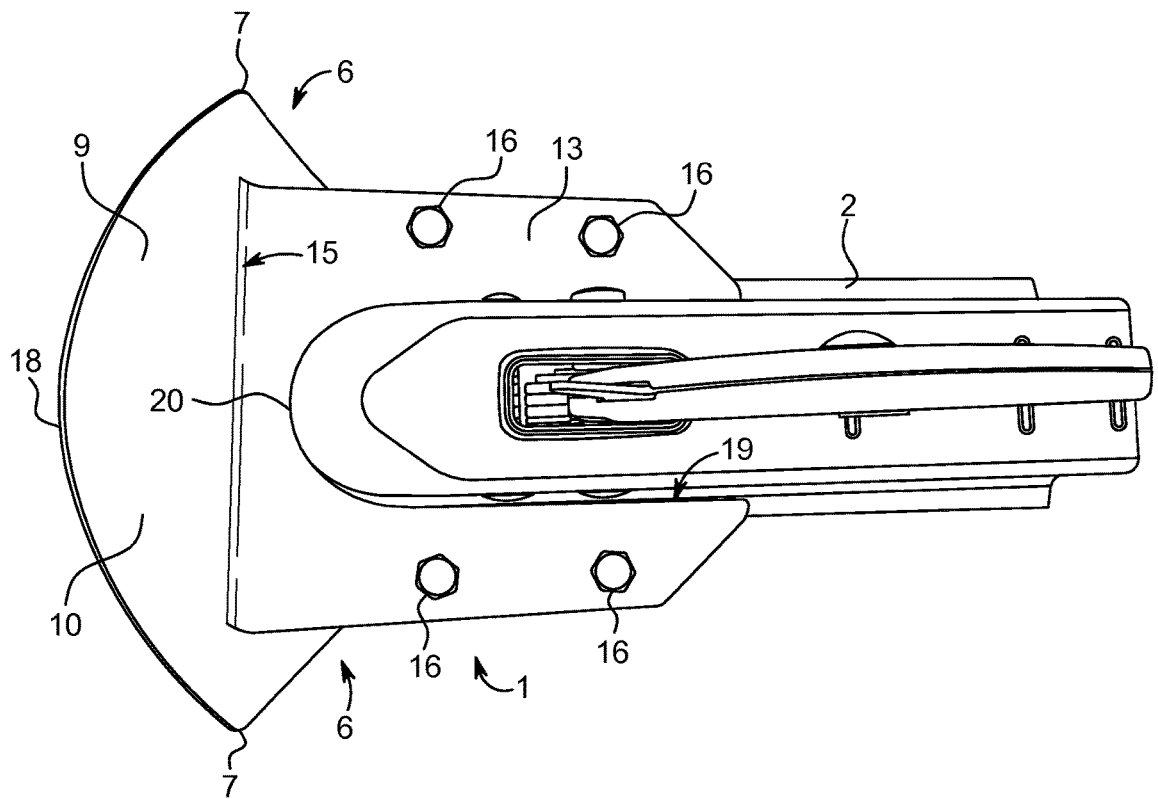
FIG. 5 shows an embodiment of the trailer hitch guide adaptor attached to a trailer tongue coupler according to the invention from a top view.

FIG. 5 shows a trailer hitch guide adaptor 1 for a trailer tongue coupler 2 and attached thereto as seen from a top view. The trailer hitch guide adaptor 1 comprises a mounting plate 3 (not to be seen from this view) configured for attachment to the trailer tongue coupler 2. There is a pair of guide plates 6, each of the guide plates 6 attached below the mounting plate 3, each of the guide plates 6 having a guide plate front-end 7 and a guide plate back-end 8 (not to be seen from this view), wherein said guide plates 6 are angled relative to each other, whereby each of the guide plate back-ends 8 converge towards each other; and a third guide plate 9 extending outwards from the mounting plate front-end 5 (not to be seen from this view), the third guide plate 9 having a third guide plate upper surface 10, wherein the third guide plate upper surface 10 defines an obtuse angle 11 (not to be seen from this view) relative to the mounting plate upper surface 4 (not to be seen from this view). The mounting plate 3 further comprises a reinforcement plate 13 attached to the third guide plate upper surface 10, the reinforcement plate having a reinforcement plate lower surface 14 (not to be seen from this view) and a reinforcement plate front-end 15 being attached to the third guide plate upper surface 10, such that the reinforcement lower plate surface 14 is parallel to the mounting plate upper surface 4, wherein the mounting plate 3 and the reinforcement plate 13 are mechanically connected to each other, thereby reinforcing the attachment of the third guide 9 plate to the mounting plate 3. In the embodiment as shown, the third guide plate 9 and mounting plate 3 are coupled to each other via screws 16. The third guide plate 9 is further shown with a third guide plate front-end with a curved path 18. The reinforcement plate 13 further comprises a slit 19 with a slit-end 20 facing the reinforcement plate front-end 15, whereby the slit 19 is able to slide onto an outer surface of the trailer tongue coupler 2.

Example 6—Trailer Hitch Guide Adaptor Attached to Trailer Tongue Coupler

Figure 6:
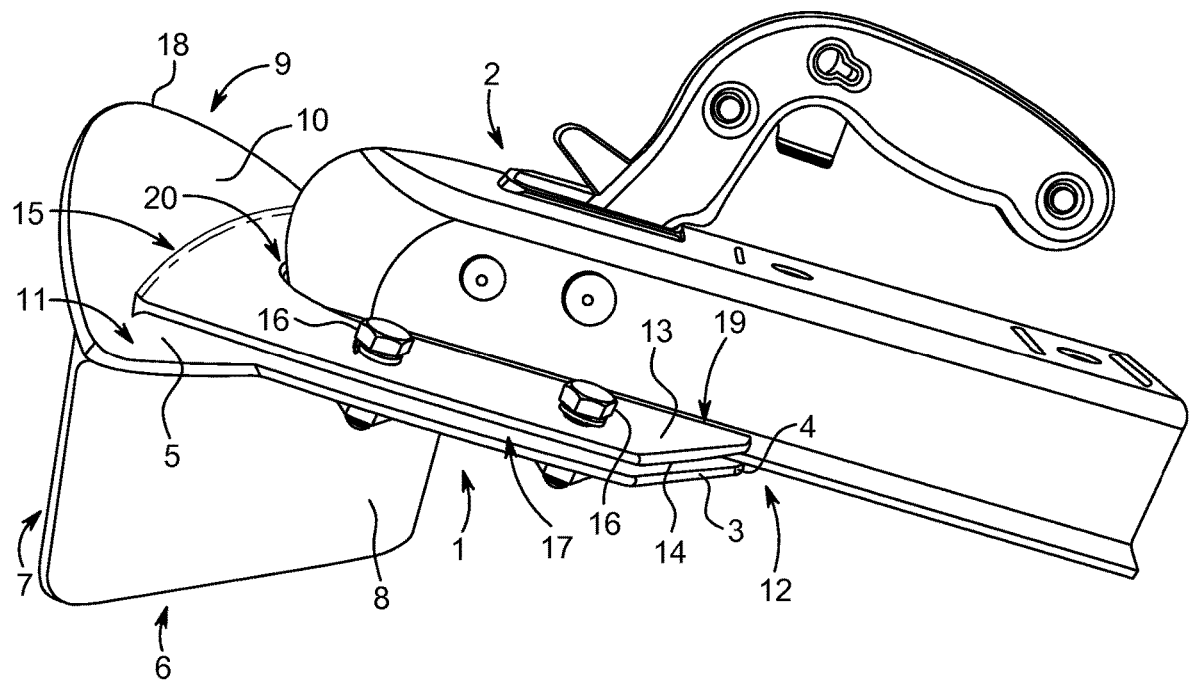
FIG. 6 shows an embodiment of the trailer hitch guide adaptor attached to a trailer tongue coupler according to the invention from a side view.

FIG. 6 shows a trailer hitch guide adaptor 1 for a trailer tongue coupler 2 and attached thereto as seen from a side view. The trailer hitch guide adaptor 1 comprises a mounting plate 3 configured for attachment to the trailer tongue coupler 2. The mounting plate 3 has a mounting plate upper surface 4 and a mounting plate front-end 5; a pair of guide plates 6 (only one to be seen from this view), each of the guide plates 6 attached below the mounting plate 3, each of the guide plates 6 having a guide plate front-end 7 and a guide plate back-end 8, wherein said guide plates 6 are angled relative to each other, whereby each of the guide plate back-ends 8 converge towards each other; and a third guide plate 9 extending outwards from the mounting plate front-end 5, the third guide plate 9 having a third guide plate upper surface 10, wherein the third guide plate upper surface 10 defines an obtuse angle 11 relative to the mounting plate upper surface 4. The mounting plate further comprising a hole 12 adapted to receive a hitch ball such that the hitch ball is able to connect with a lock inside the trailer tongue coupler 2. The mounting plate 3 further comprises a reinforcement plate 13 attached to the third guide plate upper surface 10, the reinforcement plate having a reinforcement plate lower surface 14 and a reinforcement plate front-end 15 being attached to the third guide plate upper surface 10, such that the reinforcement lower plate surface 14 is parallel to the mounting plate upper surface 4, wherein the mounting plate 3 and the reinforcement plate 13 are mechanically connected to each other, thereby reinforcing the attachment of the third guide 9 plate to the mounting plate 3. In the embodiment as shown, the third guide plate 9 and mounting plate 3 are coupled to each other via screws 16. The mounting plate 3 and a the reinforcement plate 13 are separated from each other, thereby forming a slit 17 between the mounting plate 3 and the reinforcement plate 13, whereby the trailer hitch guide adaptor 1 is able to slide onto an outer surface of the trailer tongue coupler 2. As can also be seen from the present embodiment, the pair of guide plates 6 is formed by a single plate being bended. The third guide plate 9 is further shown with a third guide plate front-end with a curved path 18. The reinforcement plate 13 further comprises a slit 19 with a slit-end 20 facing the reinforcement plate front-end 15, whereby the slit 19 is able to slide onto an outer surface of the trailer tongue coupler 2.

Example 7—Trailer Hitch Guide Adaptor Attached to Trailer Tongue Coupler

Figure 7:
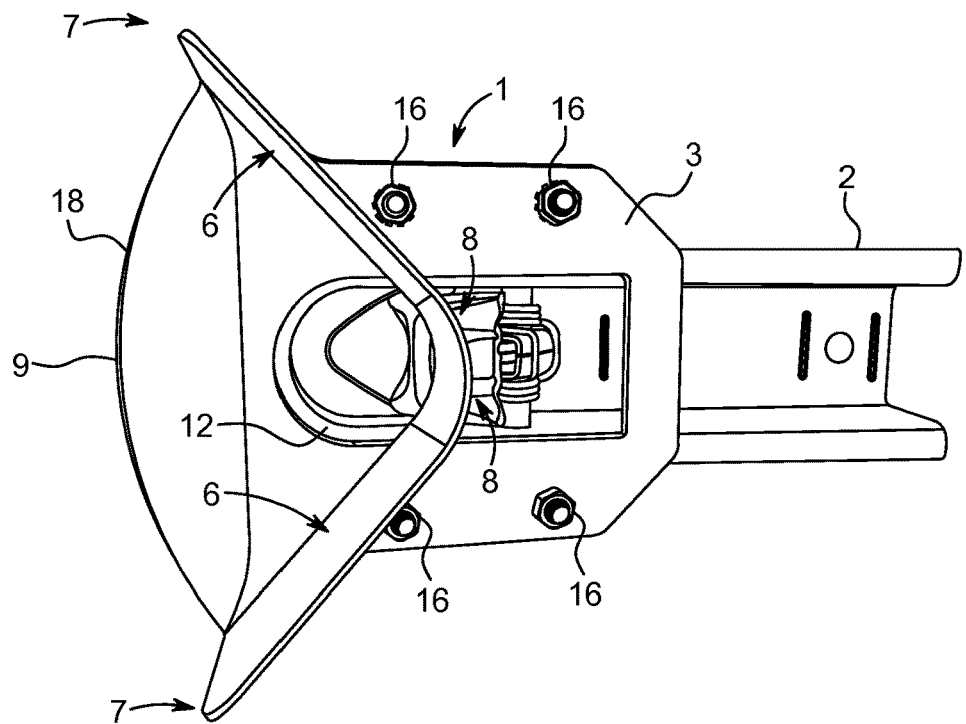
FIG. 7 shows an embodiment of the trailer hitch guide adaptor attached to a trailer tongue coupler according to the invention as seen from below.

FIG. 7 shows a trailer hitch guide adaptor 1 for a trailer tongue coupler 2 and attached thereto as seen from below. The trailer hitch guide adaptor 1 comprises a mounting plate 3 configured for attachment to the trailer tongue coupler 2. The mounting plate 3 has a mounting plate upper surface 4 (not to be seen from this view) and a mounting plate front-end 5 (not to be seen from this view); a pair of guide plates 6, each of the guide plates 6 attached below the mounting plate 3, each of the guide plates 6 having a guide plate front-end 7. The pair of guide plates 6 is formed by a single plate being bended, meaning each of the guide plate back-ends 8 connect to each other. Thus, the present example shows how the two guide plates 6 form a single-piece guiding-structure. A bended section is clearly shown between the guide plate back-ends 8. The guide plates 6 are angled relative to each other, and each of the guide plate back-ends 8 converge in the same plate in the single plate. A third guide plate 9 extends outwards from the mounting plate front-end 5, the third guide plate 9 having a third guide plate upper surface 10 (not to be seen from this view), wherein the third guide plate upper surface 10 defines an obtuse angle 11 (not to be seen from this view) relative to the mounting plate upper surface 4. The mounting plate further comprising a hole 12 adapted to receive a hitch ball such that the hitch ball is able to connect with a lock inside the trailer tongue coupler 2. As can be seen, the hole is much larger than the hitch ball because the hole is also adapted to allow for the lock to operate, i.e. move up and down in the hole. From this view, it can be seen that each of the guide plate back-ends 8 converge such that the mounting plate front-end 5 and said guide plates 7 defines an inscribed circle on a surface below the mounting plate 3 being greater than the diameter of a hitch ball. This allows for the ball to slide on the mounting plate 3 before it enters the hole. The distance from the outer perimeter to the mounting plate front-end 5 has a distance of more than 5 mm. Having a certain distance facilitates a reinforced rim around the lock in the trailer tongue coupler 2. As can also be seen, the hole is with a rim, wherein the rim is closed. The closed rim also provides for stability of the trailer hitch guide adaptor 1. However, if the trailer hitch guide adaptor is an integral part of the trailer tongue, a closed rim might not be used in that integration might provide for stability. The third guide plate 9 is further shown with a third guide plate front-end with a curved path 18.

Example 8—Trailer Hitch Guide Adaptor Attached to Trailer Tongue Coupler

Figure 8:
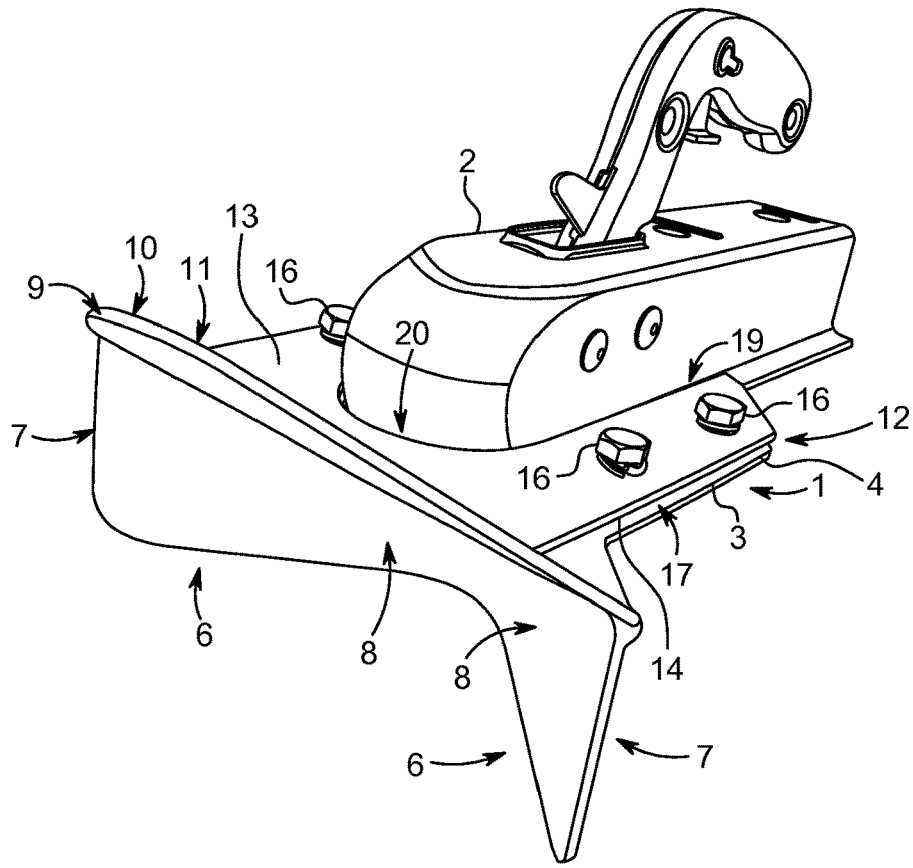
FIG. 8 shows an embodiment of the trailer hitch guide adaptor attached to a trailer tongue coupler according to the invention from a perspective view.

FIG. 8 shows a trailer hitch guide adaptor 1 for a trailer tongue coupler 2 and attached thereto as seen from a perspective view. The trailer hitch guide adaptor 1 comprises a mounting plate 3 configured for attachment to the trailer tongue coupler 2. The mounting plate 3 has a mounting plate upper surface 4 and a mounting plate front-end 5 (not to be seen from this view); a pair of guide plates 6, each of the guide plates 6 attached below the mounting plate 3, each of the guide plates 6 having a guide plate front-end 7 and a guide plate back-end 8, wherein said guide plates 6 are angled relative to each other, whereby each of the guide plate back-ends 8 converge towards each other; and a third guide plate 9 extending outwards from the mounting plate front-end 5, the third guide plate 9 having a third guide plate upper surface 10, wherein the third guide plate upper surface 10 defines an obtuse angle 11 relative to the mounting plate upper surface 4. The mounting plate 3 further comprises a reinforcement plate 13 attached to the third guide plate upper surface 10, the reinforcement plate having a reinforcement plate lower surface 14 and a reinforcement plate front-end 15 (not to be seen from this view) being attached to the third guide plate upper surface 10, such that the reinforcement lower plate surface 14 is parallel to the mounting plate upper surface 4, wherein the mounting plate 3 and the reinforcement plate 13 are mechanically connected to each other, thereby reinforcing the attachment of the third guide 9 plate to the mounting plate 3. In the embodiment as shown, the third guide plate 9 and mounting plate 3 are coupled to each other via screws 16. The mounting plate 3 and a the reinforcement plate 13 are separated from each other, thereby forming a slit 17 between the mounting plate 3 and the reinforcement plate 13, whereby the trailer hitch guide adaptor 1 is able to slide onto an outer surface of the trailer tongue coupler 2. As can also be seen from the present embodiment, the pair of guide plates 6 is formed by a single plate being bended. The reinforcement plate 13 further comprises a slit 19 with a slit-end 20 facing the reinforcement plate front-end 15, whereby the slit 19 is able to slide onto an outer surface of the trailer tongue coupler 2.

Example 9—Trailer Hitch Guide Adaptor Attached to Trailer Tongue Coupler

Figure 9:
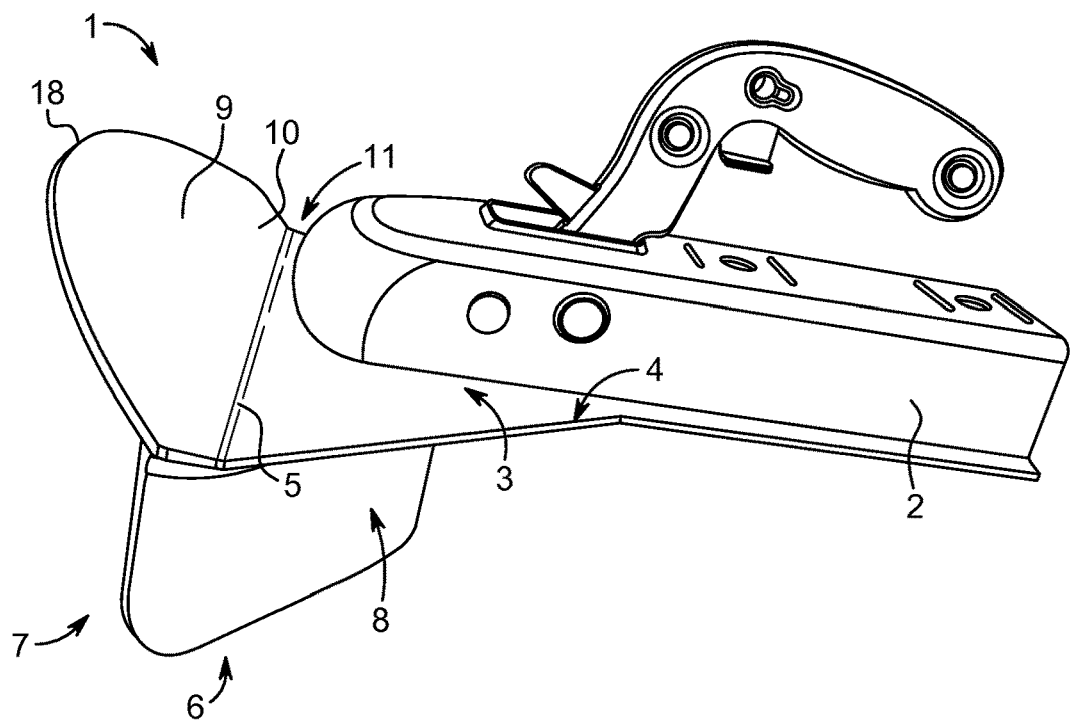
FIG. 9 shows an embodiment of the trailer hitch guide adaptor attached to a trailer tongue coupler according to the invention from a side view.

FIG. 9 shows a trailer hitch guide adaptor 1 for a trailer tongue coupler 2 and attached thereto as seen from a side view. In other words, FIG. 9 shows a trailer tongue coupler with an integrated trailer hitch guide adaptor 2. The trailer hitch guide adaptor 1 comprises a mounting plate 3 attached to the trailer tongue coupler 2. The mounting plate 3 has a mounting plate upper surface 4 and a mounting plate front-end 5; a pair of guide plates 6 (only one to be seen from this view), each of the guide plates 6 attached below the mounting plate 3, each of the guide plates 6 having a guide plate front-end 7 and a guide plate back-end 8, wherein said guide plates 6 are angled relative to each other, whereby each of the guide plate back-ends 8 converge towards each other; and a third guide plate 9 extending outwards from the mounting plate front-end 5, the third guide plate 9 having a third guide plate upper surface 10, wherein the third guide plate upper surface 10 defines an obtuse angle 11 relative to the mounting plate upper surface 4. As can also be seen from the present embodiment, the pair of guide plates 6 is formed by a single plate being bended. The third guide plate 9 is further shown with a third guide plate front-end with a curved path 18.

Example 10—Trailer Hitch Guide Adaptor Attached to Trailer Tongue Coupler

Figure 10:
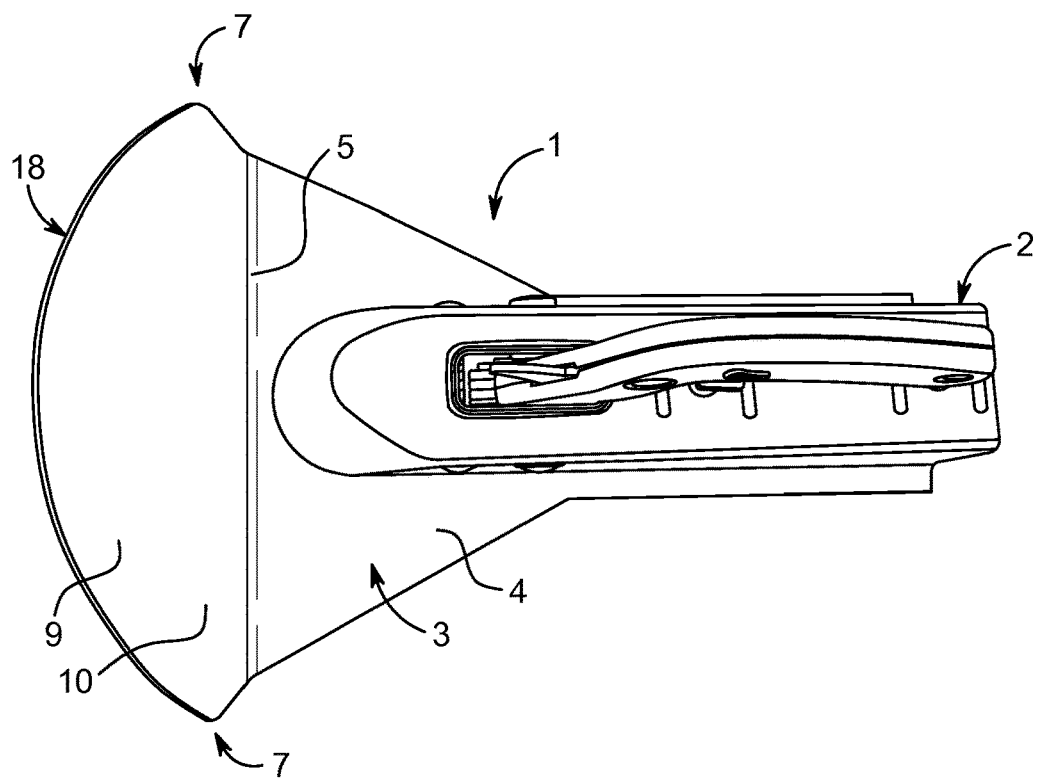
FIG. 10 shows an embodiment of the trailer hitch guide adaptor attached to a trailer tongue coupler according to the invention as seen from a top view.

FIG. 10 shows a trailer hitch guide adaptor 1 for a trailer tongue coupler 2 and attached thereto as seen from a top view. In other words, FIG. 9 shows a trailer tongue coupler with an integrated trailer hitch guide adaptor 2. The trailer hitch guide adaptor 1 comprises a mounting plate 3 attached to the trailer tongue coupler 2. The mounting plate 3 has a mounting plate upper surface 4 and a mounting plate front-end 5; a pair of guide plates 6 (not to be seen from this view), each of the guide plates 6 attached below the mounting plate 3, each of the guide plates 6 having a guide plate front-end 7 and a guide plate back-end 8 (not to be seen from this view), wherein said guide plates 6 are angled relative to each other, whereby each of the guide plate back-ends 8 converge towards each other; and a third guide plate 9 extending outwards from the mounting plate front-end 5, the third guide plate 9 having a third guide plate upper surface 10, wherein the third guide plate upper surface 10 defines an obtuse angle 11 (not to be seen from this view) relative to the mounting plate upper surface 4. The third guide plate 9 is further shown with a third guide plate front-end with a curved path 18.

The invention claimed is:

1. A trailer hitch guide adaptor for a trailer tongue coupler, comprising:
   a mounting plate configured for attachment to the trailer tongue coupler, the mounting plate having a mounting plate upper-surface and a mounting plate front-end;
   a pair of guide plates, each of the guide plates attached below the mounting plate, each of the guide plates having a guide plate front-end and a guide plate back-end, wherein the guide plates are angled relative to each other, whereby each of the guide plate back-ends converge towards each other and towards an intersection line, and wherein the guide plate back-ends are connected to each other at or around the intersection line to form a single-piece guiding-structure; and
   a third guide plate extending outwards from the mounting plate front-end, the third guide plate having a third guide plate upper surface, wherein the third guide plate upper surface defines an obtuse angle relative to the mounting plate upper surface, such that a hitch ball is able to be guided towards the mounting plate front-end via the third guide plate, and/or from below the mounting plate and towards the guide plate back ends via one of the guide plates attached below the mounting plate; and
   a reinforcement plate attached to the third guide plate upper surface, the reinforcement plate having a reinforcement plate lower surface and a reinforcement plate front-end being attached to the third guide plate upper surface, such that the reinforcement lower plate surface is parallel to the mounting plate upper surface, wherein the mounting plate and the reinforcement plate are mechanically coupled to each other, thereby reinforcing the attachment of the third guide plate to the mounting plate.

2. The trailer hitch guide adaptor according to claim 1, the mounting plate further comprising a hole adapted to receive the hitch ball such that the hitch ball is able to connect with a lock inside the trailer tongue coupler.

3. The trailer hitch guide adaptor according to claim 1, wherein the mounting plate and the reinforcement plate are mechanically coupled to each other via fastening means.

4. The trailer hitch guide adaptor according to claim 1, wherein the mounting plate and the reinforcement plate are mechanically coupled to each other via a connecting plate, such that the connecting plate is a plate between the reinforcement plate and the mounting plate.

5. The trailer hitch guide adaptor according to claim 4, wherein the reinforcement plate, the connecting plate and the mounting plate are made of one piece of material.

6. The trailer hitch guide adaptor according to claim 1, wherein the reinforcement plate further comprises a slit with a slit-end facing the reinforcement plate front-end, whereby the slit is able to slide onto an outer surface of the trailer tongue coupler.

7. The trailer hitch guide adaptor according to claim 1, wherein the mounting plate and the reinforcement plate are separated from each other, thereby forming a gap between the mounting plate and the reinforcement plate, whereby the trailer hitch guide adaptor is able to slide onto an outer surface of the trailer tongue coupler.

8. The trailer hitch guide adaptor according to claim 1, wherein the pair of guide plates is angled relative to each other with an angle between 60 and 120 degrees, or around 90 degrees or around 100 degrees.

9. The trailer hitch guide adaptor according to claim 1, wherein each of the guide plate back-ends converge such that the mounting plate front-end and the guide plates defines an inscribed circle on a surface below the mounting plate with a diameter greater than 4 cm, or greater than 5 cm, or greater than 6 cm.

10. The trailer hitch guide adaptor according to claim 1, wherein the obtuse angle is between 120 and 150 degrees, or around 130 degrees, or around 135 degrees, or around 140 degrees.

11. The trailer hitch guide adaptor according to claim 1, wherein the third guide plate comprises a third guide plate front-end with a curved path.

12. The trailer hitch guide adaptor according to claim 1, wherein at least the mounting plate and the third guide plate are formed from a single piece.

13. A trailer tongue coupler attached with the trailer hitch guide adaptor according to claim 1.

14. The trailer tongue coupler according to claim 13, wherein the trailer hitch guide adaptor is permanently attached to the trailer tongue coupler by welding.

15. The trailer tongue coupler according to claim 13, wherein the trailer hitch guide adaptor is an integral part of the trailer tongue coupler.

16. The trailer hitch guide adaptor according to claim 1, wherein the mounting plate and the reinforcement plate are mechanically coupled to each other by means of screws, welded material and/or glue.

* * * * *